United States Patent [19]
Mrozek

[11] Patent Number: 5,189,827
[45] Date of Patent: Mar. 2, 1993

[54] FISHING SPREADER

[76] Inventor: Melvin E. Mrozek, 1835 Winslow, Attica, Mich. 48412

[21] Appl. No.: 819,837

[22] Filed: Jan. 13, 1992

[51] Int. Cl.$^5$ .............................................. A01K 91/00
[52] U.S. Cl. .................................. 43/42.74; 43/44.85; 24/129 R
[58] Field of Search ................. 43/42.74, 42.83, 42.84, 43/42.85, 42.49, 42.08, 42.23; 24/129 R, 130, 71.3

[56] References Cited

U.S. PATENT DOCUMENTS

| | | | |
|---|---|---|---|
| 518,880 | 4/1894 | Evans | 24/129 R |
| 1,047,654 | 12/1912 | Klersy | 43/44.85 |
| 1,153,053 | 9/1915 | Forster | 43/44.85 |
| 1,714,770 | 5/1929 | Finn | 24/129 R |
| 2,769,270 | 11/1956 | Williams | 43/42.74 |
| 2,799,115 | 7/1957 | Reus | 43/42.74 |
| 3,426,468 | 2/1969 | Hinkson | 43/42.74 |
| 3,744,178 | 7/1973 | Denny | 43/42.74 |
| 3,991,505 | 11/1976 | Simeti | 43/42.74 |
| 4,649,664 | 3/1987 | Mahan | 43/42.49 |
| 4,989,360 | 2/1991 | Lewis | 43/42.49 |
| 4,998,374 | 3/1991 | Barnett | 43/42.74 |

Primary Examiner—Richard K. Seidel
Assistant Examiner—Chuck Y. Mah
Attorney, Agent, or Firm—Charles W. Chandler

[57] ABSTRACT

A knotless fishing device which can be connected at an adjusted position along a fishing line without forming a knot or threading the line through the body of the device. The device has a spreader wire for connecting a pair of lures such that they will not tangle either with the body or the neighboring lure.

13 Claims, 1 Drawing Sheet

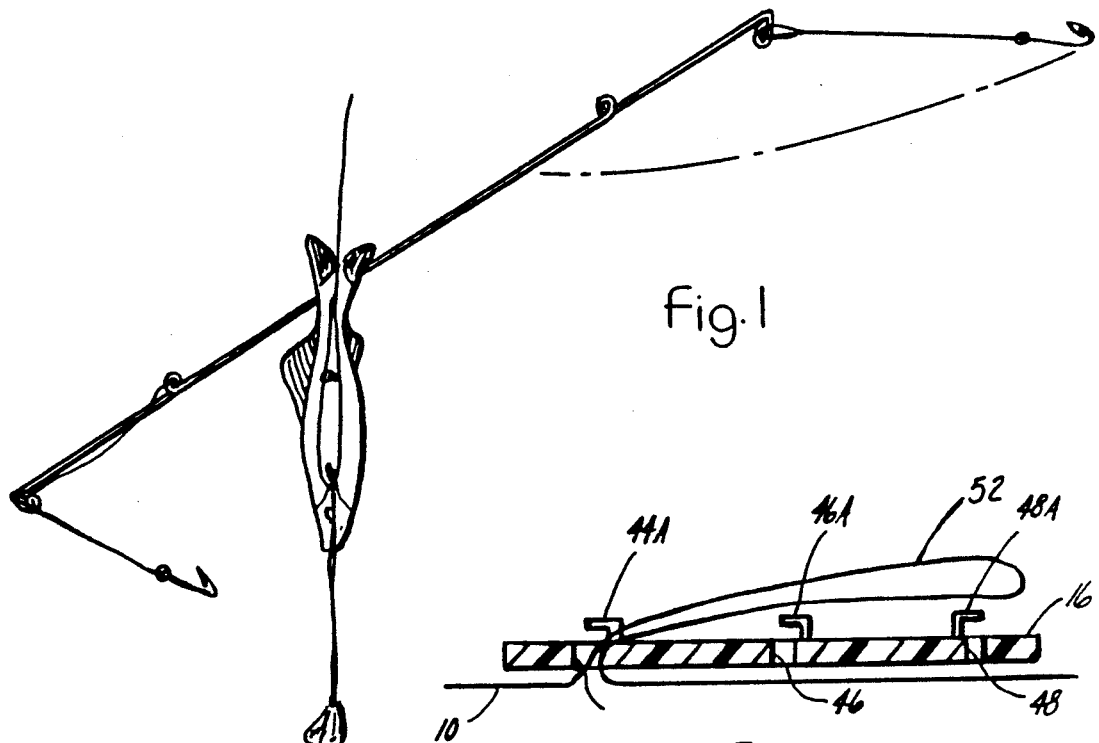
Fig. 1
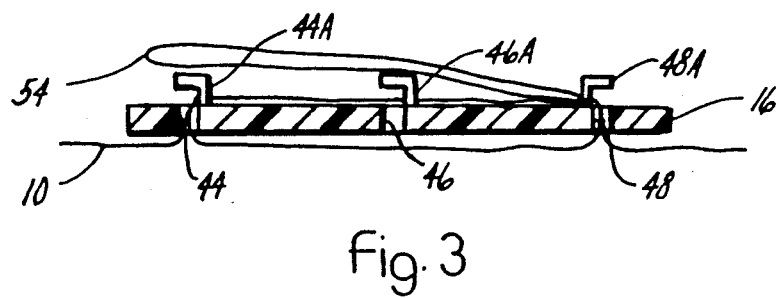
Fig. 2
Fig. 3
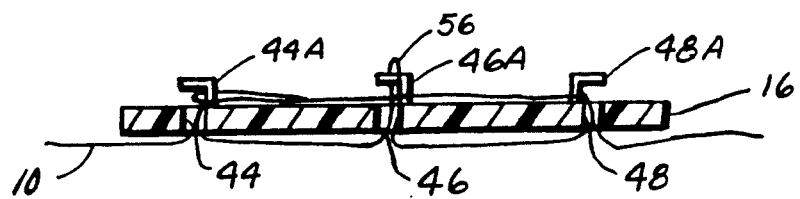
Fig. 4
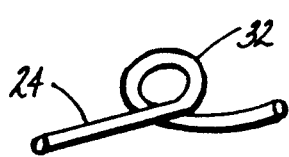
Fig. 5
Fig. 6

FISHING SPREADER

BACKGROUND OF THE INVENTION

Fishing spreaders separate two or more hooks attached to a fishing line. Usually a spreader includes a stiff wire connected to the line, and supported at right angles to the wire to separate two leadered hooks. Frequently, the spreader is attached to a weighted line. It is sometimes desirable to adjust the length of the line from the weight to the spreader. The line adjustment requires tying and untying various items of hardware, such as swivels. It is a time-consuming process.

Examples of such spreaders may be found in U.S. Pat. No. 3,426,468 which was issued to Clair L. Hinkson, Feb. 11, 1969; U.S. Pat. No. 3,744,178 which was issued Jul. 10, 1973 to Thomas A. Denny; U.S. Pat. No. 4,989,360 which was issued Feb. 5, 1991 to Roger C. Lewis; and U.S. Pat. No. 4,998,374 which was issued Mar. 12, 1991 to 0. Lynn Barnett.

SUMMARY OF THE INVENTION

The broad purpose of the present invention is to provide a fishing device which may be readily connected along the length of a fishing line without the necessity of tying knots in the line.

The preferred embodiment of the invention, which will be described in greater detail, comprises a body, preferably shaped with the profile of a minnow.

A stainless steel wire spreader, about 16 inches long, has its midsection attached to one end of the body. The spreader wire is bent with several loops.

The body has three linearly spaced openings, and a hook-shaped retainer adjacent each opening. A fishing line is attached to the body by forming a loop for each opening. Each loop is inserted through its opening. The loops in the two end openings are wrapped around the retainers at the opposite end of the body. The loop in the middle opening is wrapped around its own retainer. When the three loops are wrapped around the three retainers, the line is pulled taut. Normally a weight is connected to the lower end of the line, the upper end being connected to a fishing pole.

The height of the bait from the bottom of the body of water can be quickly adjusted by adjusting the length of line from the weight to the spreader. This is achieved by removing the looped line from the center retainer. The user can either raise or lower the spreader as desired. Once the height has been correctly adjusted, the line is then looped around the center retainer. Some times the loops must be unhooked from both the center retainer and one of the end retainers, depending on the line diameter.

The device obviates the problem of the tangling of hooks, leaders and fishing lines. Further, the minnow-shaped body may serve as a fish attractor.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a view illustrating the manner in which the fishing line is connected in a tieless manner to the spreader body;

FIG. 2, 3 and 4 illustrate the manner in which the fishing line is progressively connected to the spreader body;

FIG. 5 is a view of an individual spreader loop; and

FIG. 6 is a view of an end spreader loop.

DESCRIPTION OF A PREFERRED EMBODIMENT OF THE INVENTION

Referring to the drawing, FIG. 1 illustrates a conventional monofilament fishing line 10 having its lower end connected to a weight 12. Weight 12 normally rests on the bottom of a body of water. Fishing line 10 is connected to a spreader device, generally illustrated at 14. The spreader device comprises a plastic body 16. Body 16 is preferably elongated and formed with the profile of a minnow. It is relatively thin, for example, about ⅛ inch thick, and about 2½ inches long.

The midsection of a stiff, but resilient, stainless steel spreader wire 18 is fastened by any suitable means to the upper end of body 16, preferably at right angles to the longitudinal axis of the body. Wire 18 has a diameter of about 0.030 to 0.035 inches.

The spreader wire forms a pair of arms 22 and 24. The outer end 26 of arm 24 is formed into a double wire loop, as illustrated in FIG. 6. The wire loop is adapted to receive the looped end 28 of the leader 30 of hook 32. The length of arm 24 is greater than the length of leader 30 so that hook 32 cannot become tangled with body 16 or with a hooked lure connected to arm 22.

Arm 24 also has an intermediate single wire loop 32, generally bent as illustrated in FIG. 5. Arm 22 has a looped end 34 which is identical to looped end 26 for receiving a leader. Arm 22 also has a loop 36 identical to loop 32. A leader 38, having a hook 40, is connected to both loops 34 and 36. The conventional looped end 42 of the leader is connected to spreader wire loop 36. The leader is threaded through loop 34 so that hook 41 cannot become tangled with either body 16 or the leadered hook on arm 24.

Referring to FIGS. 1-4, body 16 has three longitudinally spaced openings 44, 46 and 48. Each opening has a size sufficient to receive a looped section of fishing line Hook-shaped retainer members 44A, 46A and 48A are mounted adjacent openings 44, 46, and 48, respectively.

Fishing line 10 is formed with three loops 52, 54 and 56. In order to connect the body to the line, the user first inserts loop 52 from the back side of the body through opening 44 and pulls it down until it is wrapped around retainer 48A.

Secondly, referring to FIG. 3, the user inserts loop 54 through opening 48 and then pulls it to the opposite end of the body until it can be looped around retainer 44A.

Then the user inserts loop 56 through the middle opening 46 until it is looped around retainer 46A.

The user then pulls the line taut from opposite ends of the body which forms a knotless connection.

The process can be reversed by pushing the center loop through its opening until it is free of the retainer and then withdrawing it from the opening. This permits the body to be slid along the line to a new position. The center loop is then inserted through its opening and hooked around retainer 46A and the line then drawn taut.

In some cases, depending upon the diameter of the line, the user may have to remove loop 46 from its retainer and unhook either loop 52 or 54 from its retainer in order to slide the body along the line. The loops are then hooked to their respective retainers.

The back side of each opening is somewhat rounded so as to reduce any stress concentrations on the line.

The fishing line can be attached to the sinker, either by tying a knot or using a common swivel snap.

Having described my invention, I claim.

1. A combination of a fishing device connected in a knotless connection to a continuous fishing line, comprising:

an elongated, relatively stiff spreader wire means having a first arm and a second arm, each of the arms having an inner end and an outer end, said arms each being adapted for connection to a fishing lure in a position spaced from their respective inner ends;

a generally elongated, flat body attached to the inner ends of the arms such that the outer end of the first arm is spaced with respect to the outer end of the second arm;

the body having first and second opposed sides and a pair of longitudinally spaced openings extending through the body from the first side to the second side so as to face in a common direction;

retainer structure mounted on the first side of the body substantially aligned with the pair of spaced openings;

a fishing line having a plurality of loops, each loop being received in a corresponding one of the spaced openings and at least two of the loops being wrapped around the retainer structure remote from the opening through which the loops have been inserted;

whereby the body is connected to the fishing line at a selected position along the line when the line is pulled taut.

2. A combination as defined in claim 1, in which the retainer structure is located adjacent each of the openings, and extends generally normal to the plane of the first side of the body.

3. A combination as defined in claim 1, including a third opening aligned and between said pair of openings, the third opening facing in a common direction with respect to the pair of spaced openings, including additional retainer structure disposed adjacent the third opening.

4. A combination as defined in claim 1, in which the retainer structure has a generally hooked-shaped configuration and is disposed between the first pair of openings.

5. A combination as defined in claim 1, in which the spreader wire is formed of a stainless steel wire.

6. A combination as defined in claim 1, including a lure having a hook with an elongated looped leader, the first spreader wire arm having a loop at the end thereof for engaging the looped end of the leader.

7. A combination as defined in claim 1, in which at least one of the arms has a first loop between its inner end and its outer end, and including a lure having a hook with an elongated looped leader, the loop of the leader being connected to the first loop in the arm, and the arm having a second loop at its outer end, the leader being threaded through the loop at the outer end in such a manner that the hook can be swung about the end of the arm but cannot engage the body.

8. A combination as defined in claim 1, in which the body is shaped with the profile of a fish.

9. A combination as defined in claim 1, including a weight connected to one end of the fishing line.

10. A combination of a fishing device connected in a knotless connection to a continuous fishing line, comprising:

an elongated, relatively stiff spreader wire means having a first arm and a second arm, each of the arms having an inner end and an outer end, said arms each being adapted for connection to a fishing lure in a position spaced from their respective inner ends;

a generally elongated, flat body attached to the inner ends of the arms such that the outer end of the first arm is spaced with respect to the outer end of the second arm;

the body having first and second opposed sides and a pair of longitudinally spaced openings extending through the body from the first side to the second side so as to face in a common direction, the openings being aligned in a direction generally perpendicular to the spreader wire arms;

hook-shaped retainer structure mounted on the first side of the body adjacent each of the pair of spaced openings, the retainer structure being disposed generally normal to the plane of the first side of the body; and a fishing line having a pair of loops, each loop being received in an associated openings and being wrapped around the retainer structure adjacent the openings receiving the other of said pairs of loops such that each looped line is generally aligned with said pair of openings, adjacent the other looped line;

whereby the body is connected to the fishing line at a selected position along the line when the line is pulled taut.

11. A method for connecting a body to a fishing line without either tying a knot in the line or threading the end of the line through the body, comprising the steps of:

forming a body having a plurality of openings and a corresponding number of retainer structures on a common side of the body;

forming a loop in the line for each of said openings;

inserting each of the loops through its associated opening in the body;

looping three of the loops around said retaining structure, at least two of the loops being wrapped around retaining structure remote from the openings in which the two loops have been inserted; and pulling the line taut from opposite ends of the body to connect the body to the line.

12. A method as defined in claim 11, in which the body can be relocated to an adjusted location along the length of the line by pushing one of the loops through its associated opening so that each of the loops is loose with respect to the body, and moving the body along the line and then pulling the line taut to connect the body to the line at an adjusted location.

13. A method for connecting a body to a fishing line without either tying a knot in the line or threading the end of the line through the body, comprising the steps of:

forming an elongated body having at least a pair of longitudinally spaced openings, and a corresponding number of retainer structures on a common side of the body and generally aligned with said spaced openings;

forming a loop in the line for each of said openings;

inserting each of the loops through its associated opening in the body;

wrapping a pair of said lops around said retaining structure remote from the openings in which the pair of loops have been inserted, such that the looped line is generally aligned with said pair of spaced openings; and pulling the line taut from opposite ends of body to connect the body to the line.

* * * * *